United States Patent [19]

Wendler

[11] 3,957,397

[45] May 18, 1976

[54] CONVERSION OF WIND ENERGY TO MECHANICAL ENERGY

[76] Inventor: Clarence Wendler, 244 N. Fourth, Dighton, Kans. 67839

[22] Filed: Dec. 30, 1974

[21] Appl. No.: 537,097

[52] U.S. Cl. .................................. 417/271; 74/18.1; 417/334

[51] Int. Cl.² .......................................... F04B 17/00

[58] Field of Search ............... 74/18.1; 417/35, 271, 417/334, 335, 336

[56] References Cited

UNITED STATES PATENTS

| | | | |
|---|---|---|---|
| 643,918 | 2/1900 | Textorius | 417/271 |
| 1,360,222 | 11/1920 | Johnston | 417/271 |
| 2,460,527 | 1/1949 | Oliveros | 417/336 |

*Primary Examiner*—William L. Freeh
*Assistant Examiner*—G. P. La Pointe
*Attorney, Agent, or Firm*—Robert E. Breidenthal

[57] ABSTRACT

An omnidirectional windmill mounted on and affording traction power to a carriage traveling an endless path about a nutating wheel that is drivingly coupled to means for pumping water from a lower fish farm to an upper fish farm in a system whereby such potential gravitational energy can be recovered and converted to electrical energy.

14 Claims, 8 Drawing Figures

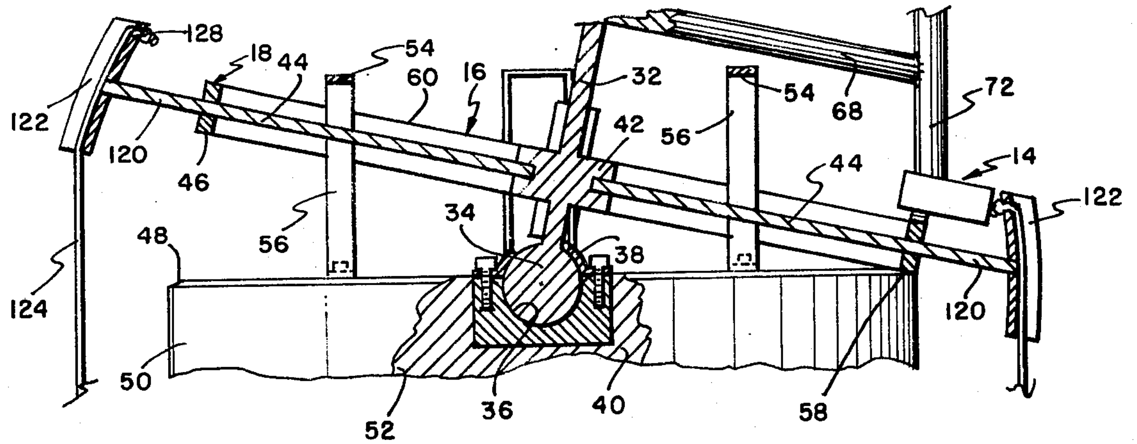
FIG. 3
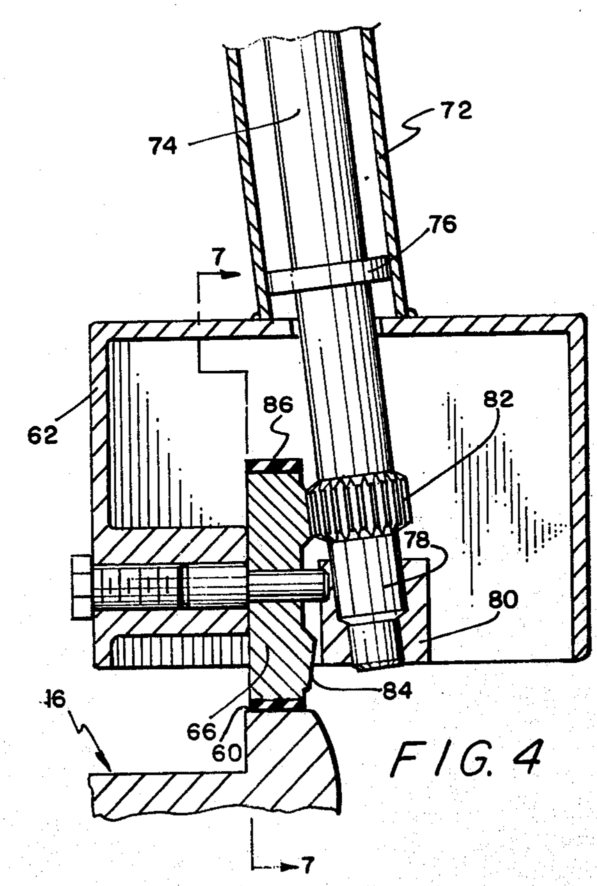
FIG. 4
FIG. 5
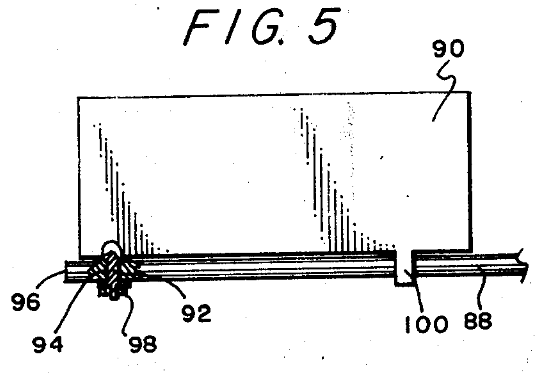
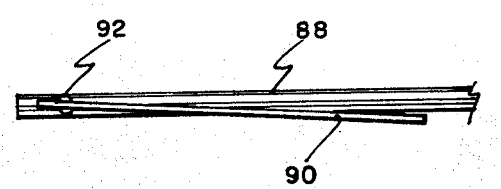
FIG. 6

CONVERSION OF WIND ENERGY TO MECHANICAL ENERGY

The present invention pertains to new and useful improvements in energy conservation systems as well as to contributions to preservation of the ecology and the production of high protein food, and more particularly relates to (a) the use of an omnidirectional windmill to drive a carriage supporting the same about a predetermined closed circuit course, (b) the movement of a massive object to cause nutation of a wheel that drives in phased synchronism a plurality of energy transducers having reciprocating inputs, and (c) an energy storage and recovery system employing a pair of fish farms at different elevations.

The paramount aims of the present invention are to (a) maximize utilization of wind energy to minimize both the consumption of fossil and nuclear fuels and the dangers and ecological damage accompanying such consumption, (b) to effect the conversion of relatively high speed windmill rotation to relatively slow cyclic reciprocating drive to a plurality of energy transducers that are phased to constitute a substantially constant rate of energy transfer, and (c) to combine fish farming with energy storage whereby water can be aerated for oxygenation thereof during movement between upper and lower fish farms.

A broad aspect of the invention has to do with apparatus for converting wind motion to mechnical motion comprising an endless track means defining an endless path, carriage means on said track means, said carriage means including a traction wheel in operative engagement with the track means whereby the carriage means can be propelled about the endless path, omnidirectional windmill means carried by the carriage means, means drivingly connecting the windmill means to the traction wheel, and an energy transducer driven by movement of the carrige means about its endless path.

Another broad aspect of the invention has to do with the above mentioned track means being circular and disposed about a central axis normal to the plane of the circular track means, an axle coaxial with said axis, a radius arm having its opposite ends connected to the axle and to the carriage for angular movement about the axis, and means inmounting the axle for nutation movement about a vertical axis, and means mounting the track means on the axle for maintaining the axle and track means mutually perpendicular while also preventing rotation of the track means about the vertical axis, the arrangement of the recited means and the distribution of the masses of the movable parts thereof being such that the axle tends gravitationally to be inclined toward the position of the carriage means.

Still another broad aspect of the invention involves a combined energy storage and food producing system comprising upper and lower water reservoirs, aquadic food producing means associated with at least one of said reservoirs, means for raising water from the lower reservoir to the upper reservoir whereby gravitational energy can be stored, and energy transducer means operable by movement of water from the upper to the lower reservoir for recovery of gravitationally stored energy.

A cursory background appreciation of omnidirectional windmills and the prior use of elevating water can be obtained on considering the following U.S. Pat. Nos.:

1,010,591, Clements, Dec. 5, 1911
3,803,422, Krickler, Apr. 9, 1974

The foregoing does not exhaust the prior art pertaining to omnidirectional windmills and indeed such term is meant to include any windmill which is such as to respond automatically to wind from any arbitrary direction (such as the horizontal axis rotary fan directed azmuthally into the wind by a wind vane) though the types are preferred wherein the component directly driven by the wind rotates above a vertical axis such as, for example, the type recently publicized in the press as undergoing U.S. Government testing through the instrumentality of NASA. The vane directed type of windmill can be used and the use thereof might, as will be seen, become preferable when excessively high winds can make use of the directing vane to direct the fan from facing directly into the wind.

The above listed patents are merely suggestive of a large number of proposals having to do with elevating water to store energy gravitationally and means from retrieval of such stored energy.

The invention will be best understood in the light of the following description of a preferred embodiment thereof, such description being presented in conjunction with the accompanying drawings, wherein:

FIG. 3 is an enlarged and fragmentary vertical sectional view taken upon the plane of the section line 3—3 of FIG. 1;

FIG. 4 is an enlarged vertical sectional detail view of the carriage;

FIG. 5 is an elevational and fragmentary view of one of the sails of the windmill with the pivotal mounting of the same on one of the spokes being shown in section;

FIG. 6 is a top plan view of the structure shown in FIG. 7;

Figure 1:
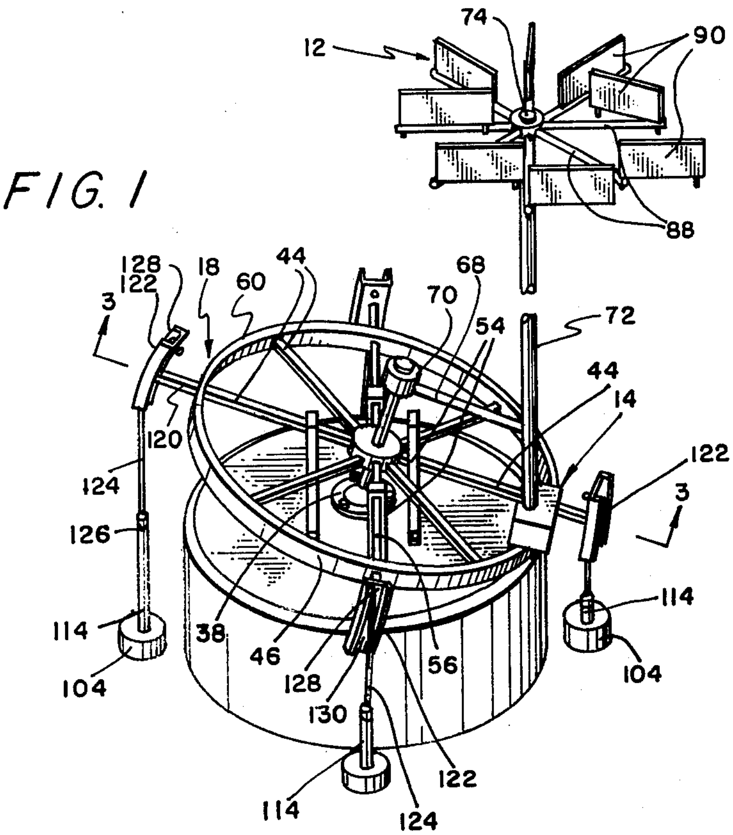
FIG. 1 is an isometric view of the nutating wheel and illustrates its relationship to the windmill driven carriage and to the pump rods of the water pumps.
Figure 2:
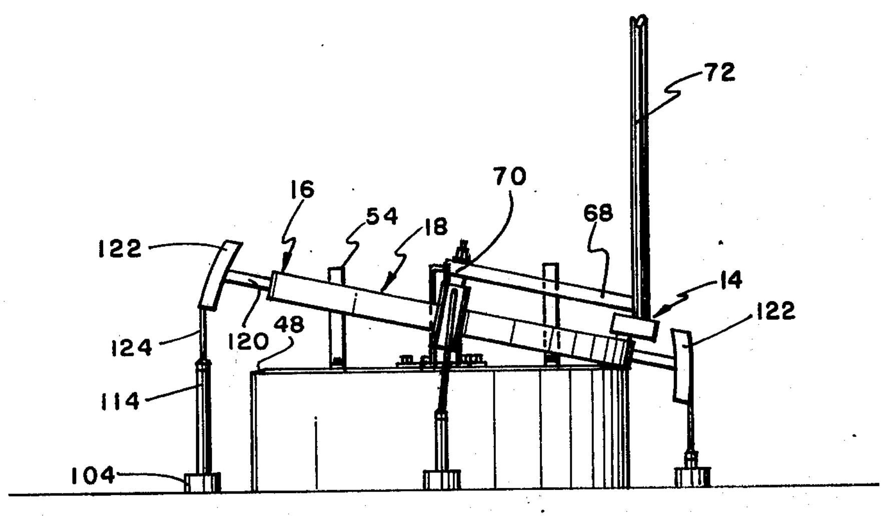
FIG. 2 is a side elevational view of the structure of FIG. 1 with the wind actuated elements being broken away.
Figure 7:
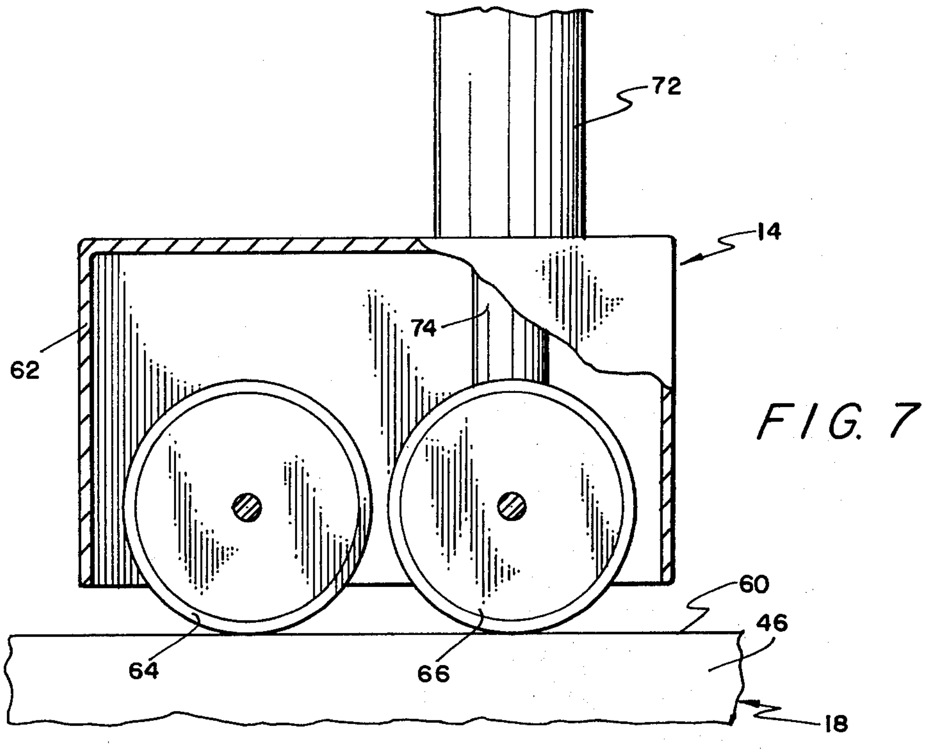
FIG. 7 is a sectional view taken from the broken section line 7—7 of FIG. 3; and, FIG. 8 is a diagrammatic view of the farming and wind energy storage system, with subterranean parts being illustrated in dashed outline.
Figure 8:
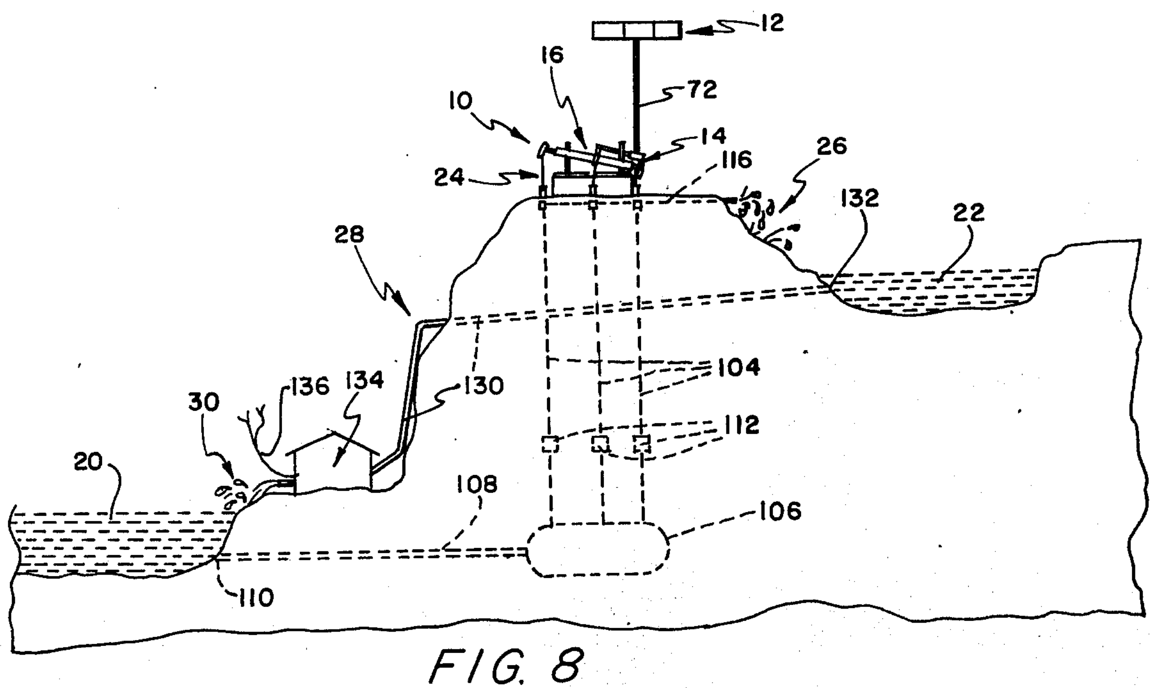

Referring now to the drawings wherein like numerals designate like parts throughout the various views, the reference numeral 10 designates the farming and energy storage system generally, the principle components of which are an omnidirectional windmill 12, a carriage 14 drivingly coupling the windmill 12 to a nutating wheel 16 carrying track means 18 supporting the carrige 14. The reference numerals 20 and 22 respectively designate lower and upper water reservoirs that serve as fish farms, and the reference numerals 24 and 26 respectively designate means driven by the wheel 16 for pumping water from the lower reservoir 20 to the upper reservoir 22 and means for aerating the pumped water. The reference numerals 28 and 30 respectively designate transducer means for retrieving and converting potential energy stored in the pumped water and means for aerating water returned to the lower reservoir 20 by the transducer means 28.

The nutating wheel 16 is a massive structure having an axle 32, the lower end 34 of which is of ball shape and received in a bearing socket 36 and is retained therein by an anchored annular retaining member 38.

The bearing socket 36 is carried by a substantial earth foundation 40.

The axle 32 is fixed to a hub 42 from which radiate a plurality of spokes 44. The wheel includes a rim 46 that rollingly engages and is supported on the horizontal top 48 of an annular wall 50 that has a substantial earth foundation 52. Means is provided for preventing rotation of the wheel about a vertical axis and such means conventionally includes a plurality of vertical guide posts 54 disposed intermediate the socket 36 and the annular wall 50. Each of such vertical guide posts 54 has a vertical guide slot 56 therein slidingly receiving therethrough one of the spokes 44 whereby such spokes 44 can move or oscillate vertically, but cannot rotate in a horizontal plane about the socket 36.

The contacting portions of the rim 46 and the wall top are of identical circumferential extents with the result being that frictional engagement of the rim 46 and the wall top 48 at the rolling point of contact 58 tends to prevent rotation of the wheel 16 about a vertical axis through the center of the ball 34.

The wheel 16, which has a center of mass coincident with the center line of the axle 32 and preferably well above the center of the ball 34, and its mounting is such that if a downwardly directed force is caused to progressively travel about its periphery the wheel 16 will describe a nutating motion. The nutating motion entails the axle 32, while not rotating, tracing out the surface of a right circular cone of vertical axis that opens upwardly from an apex at the center of the ball 34.

The carriage 14, its mounting, and the windmill 12 constitute means for effecting such downward force and progressive movement of the latter to cause the nutation movement of the wheel 16.

The track means 18 can, as shown, simply comprise the upper edge 60 of the rim 46. The carriage 14 includes a housing 62 in which are rotatably mounted a pair of wheels 64 and 66 that engage the rim edge 60, whereby the carriage is rollingly supported on the wheel 16. A rigid radius arm 68 is fixed to the carriage housing 62 and has its free and rotatably journaled, as at 70, upon an upper extension of the axle 32. The arrangement is such that the carriage 14 is constrained to travel about the rim edge 60. wheel 16

A tubular mast 72 is fixedly mounted on the top of the carriage housing to extend vertically upwardly therefrom (the wheel being in a nutating position). A shaft 74 coaxially extends through the mast 72 and is journaled for rotation therein by a plurality of vertically spaced bearings therein such as the one shown at 76 in FIG. 4.

The lower end 78 of the shaft 74 rotatably extends into the interior of the carrige housing 62 and has such lower end rotatably supported in a suitable thrust bearing 80 carried by the carriage 14. The shaft 74 has a pinion gear 82 fixed thereto that drivingly engages a ring gear 84 fixed to the carriage wheel 66 whereby rotation of the shaft 74 forces the wheel 66 to rotate. The wheel 66 serves as a driven traction wheel and to assure traction engagement with the rim edge 60, the wheel 66 may be provided with a rubber peripheral portion or tire 86.

The windmill 16 comprises a plurality of radially extending spokes 88 fixed to the upper end of the shaft 74. Each of said spokes 88 has a wind sail 90 associated therewith. Since all the spokes 88 are identical and since each of the sails 90 are identical to each other and in their relationship to the spokes 88, a detailed description of one of such sails 90 and one of such spokes as shown in FIGS. 5 and 6 will suffice for all. The sail 90 is of generally rectangular planar configuration and is disposed in a vertical plane.

Adjacent one of its ends the sail 90 is provided with a depending pivot pin 92 that is journaled at 94 through the spoke 88 adjacent the free end 96 of the latter. Except as hereinafter explained, the sail 90 is free to swing horizontally about the vertical axis of the pivot pin 92 above the horizontal spoke 88. A nut 98 is secured on the lower end of the pin 92 to prevent inadvertent detachment of the sail 90 from the spoke 88.

Adjacent the end of the sail 90 remote from the pivot pin 92, the sail 90 is provided with a depending stop member 100 that is engageable with the spoke 88 to limit relative swinging movement in both directions.

The omnidirectional windmill 12 is of a well known general type and the operation thereof will require little explanation. With wind blowing from left to right as seen in FIG. 1, the windmill 12 will be driven clockwise as viewed from above. Each sail 90 tends to weather vane (trail downward from its pivot), however, each sail 90 will be limited by its stop member against making a complete revolution in one direction relative to the spoke 88 when the latter makes a complete revolution in the opposite direction relative to the wind direction. The result is that during about one-half of each revolution of the spoke 88, the sail 90 has its stop 100 bearing thereagainst. Such one-half revolution of the spoke 88 occurs as the spoke 88 travels the 180° of its rotation that is down wind; the sail 90 weather vaning during the upwind movement of the spoke. The sail 90 and the spoke 88 coact to urge rotation of the shaft 74.

It is to be noted that the windmill 12 responds to wind from any direction, and that the same will continue to rotate in either direction in which it is initially driven.

Any form of windmill can be used that will drive the carriage 14 about the wheel 18. The windmill 12 is merely exemplary of many types of windmills that could be employed to drive nutating movement of the wheel 18, as will be evident to those skilled in the art. The windmill 12 is shown only as to essentials thereof and it can incorporate refinements and improvements such as shown in the following U.S. Pat. Nos.:

321,292, Hatfill, June 30, 1885
666,908, Register, Jan. 29, 1901
297,904, Witherspoon, Apr. 29, 1884
1,115,313, Henning, Oct. 27, 1914
1,285,661, Ford, Nov. 26, 1918
1,804,241, Whipp, May 5, 1931

Illustration and description of details of a sophisticated form of an omnidirectinal windmill are omitted as they are well known and as such would tend to obscure and obfuscate the thrust of the instant invention.

Nutating motion of the wheel can by any one of numerous forms of well known means be coupled to drive apparatus for immediate energy utilization such as the driving of electrical power generators, grain milling apparatus, etc.

On the other hand, the nutating motion can be applied to feed energy into a wide variety of energy storage systems associated with energy recovery systems to meet varying energy consumption demands and/or varying rates of the storage of energy. A large number of energy storage systems have been proposed and are well known to those skilled in the art. For example, energy can be stored in chemical form, usually involving an intermediate electrical form such as in electrical storage batteries, in hydrogen and oxygen gas obtained upon the electrolysis of water, etc. Considerable attention has been given to the storage of energy in kinetic energy form, especially of late, and those conversant with the art could readily apply the output of the nutating wheel to the rotation of flywheels, etc.

The output of the nutating wheel 18 can be applied to store energy by biasing steel springs or resilient systems employing elastomers; however, the preferred manner of storing the energy or work output of the present invention is to store the energy as potential energy by elevating a mass against the earth's gravitational field; particularly by raising water from one level to another and higher level.

Energy storage for subsequent recovery by elevating water is not broadly new, as inspection of the previously mentioned U.S. patents will reveal; however, the nutating wheel is uniquely well suited to the syncronized operation of a plurality of reciprocating deep well type pumps for elevating water. The operation of the pump is relatively slow and ponderous so as to avoid the rapid deterioration of high speed equipment while effecting a nearly constant pumping rate, while also presenting a nearly constant load to the windmill.

The water pumping system 24 comprises a plurality of pumping units 112 circumferentially and equiangularly spaced about the wheel 18. Each of such units 112 is in the nature of a deep well pump comprising a well casing 104 extending vertically from the surface to a subterranean water sump 106 that receives water from the lower farm or reservoir 20 via a passageway 108. The passageway 108 has a screened inlet 110 to prevent fish from becoming entrapped in the sump 106. A reciprocating pump 112 is associated with each of the pump units 102 and is interposed in the casing 104 at a position that is at a level just a few feet above the lowest level of water in the farm 20 so that the pumps 112 can raise water in the liquid phase.

The pumps 112 are conventional and are such as are operated by vertical reciprocation of a sucker rod 114 that is driven by surface equipment. Such pumps have been in widespread use in oil wells, water wells, etc., for may years. The pumps 112, as conventional, have screened inlets, not shown.

It is to be noted that the site selected for practice of the invention is such that the terrain surface varies in elevation so that the farm 22 is at an elevation substantially higher than that of the farm 20. The difference in elevation is preferably as practically possible without encountering an excessively large horizontal separation.

The nutating wheel 16 is situated at an elevation that is higher than that of the upper surface of the farm 22 so that water elevated by the pumps can pass gravitationally from a header 116 to which all the casings 104 are coupled to the aeration means 26 with sufficient head pressure to effect a substantial water-air contact before the water descends to the farm 22. The aeration means 26 can be a sequence of cascade steps or spray heads, neither being shown in detail as they are well known in the art.

The nutating wheel 16 is especially well suited to actuate sequential and cyclic vertical reciprocation of the sucker rods 114 of all the pumping means 24. The coupling of the wheel 16 to the sucker rods 114 comprises the wheel having arms 120 projecting radially outward from the rim or track means 18 that are provided with arcuate members 122 at their outer ends.

The arms 120 can conveniently be constituted of integral extensions of some of the spokes 44.

The arcuate members 122 are disposed above the various sucker rods 114of 114 of pumping means 24. It will be appreciated that the motion of each of the arcuate members 122 is primarily vertical oscillation about the center of the ball 34, with other motions such as rocking about a horizontal axis through the ball 34 is relatively minor. This is in part due to the member 122 having a much greater spacing from the hub 42 than the latter has from the ball 34.

Each member 122 is coupled to its associated sucker rod 114 by means of a flexible steel cable 124 having its lower end fixed to the upper end of the sucker rod 114 at 126 and its upper end fixed to the top of the arcuate member 122 at 128, with the intermediate extent of the cable 124 being entrained over the arcuate surface 130 of the member 122. The surface is such that the vertical projection of the associated sucker rod 114 is substantially tangential thereto during nutation of the wheel 16. The arrangement of the member 122, its arcuate surface 130, the cable 124 and the sucker rod 114 is quite analogous to the coupling of the walking beam of conventional oil well pumping apparatus to the well sucker rod as will be manifest to those skilled in the art.

While the water pumped by each individual pumping unit is intermittent, it is noted that the pumps driven by the wheel 16 as described above are phased in the timing of their output strokes so that the overall pumping rate is relatively constant and proportional to the rate of nutation of the wheel 16. The effect is in some respects analagous to the relatively constant power output of an eight-cylinder four-stroke cycle internal combustion automobile engine as compared to what one might expect from a single cylinder two-stroke cycle engine. As in the case of automobile engines, more pumping units will further smooth out the output.

It should be noted that the invention is not limited to an even number of or diametrically opposed pumping units. It should be noted that whereas oil well pumping apparatus of the walking beam type requires a massive conterweight to roughly balance the weight of the sucker rod, etc., such is not required in the practice of the present invention as diametrically opposed wells serve the counterweight function for each other. The coacting wells need not be 180° apart as will be perceived on brief reflection. The counterweight functions tend to smooth out in a manner somewhat similar to the smoothing out of the pumping output. The greater number of pumping units, the more nearly the center of gravity or mass of all moving parts remains vertically stationary.

When it is desired to recover potential energy stored in water that has been pumped from farm 20 to farm 22, such water is allowed to return to farm 20 through a pipe 130 having a screened inlet 132 below the surface of the farm 22, a hydroelectric power plant means 134, and thence the aerating means 30. The aerating means 30 can be such as the means 26 and enables the water to approach equilibrium with ambient air with oxygenation thereof being a prime objective. Preferably both the aerating means 26 and 30 expose the water to such sunlight as may be present to effect ultraviolet irradiation thereof.

The power plant 134 extracts insofar as practically possible all the potential energy released of the water descent in excess of that required for the aeration means 30 and produces in a conventional manner electrical energy that is delivered to conventional electric power transmission lines 136. The latter can if desired be part of a power grid whereby the alternators (not shown) of the plant 136 can during its operation ease the load on and the fuel consumption of distant alternators (not shown) normally feeding the power grids.

Since the style of and the operation of individual fish farms does not in and of itself constitute the subject matter of this invention, a description of the details thereof such as the spawning facilities, means of nurturing the fish, harvesting and so forth would not contribute to an understanding of the present invention. Suffice to say that the style and operation of fish farms is well known in the art and a full appreciation thereof can be readily obtained on consulting the extensive literature pertaining to the same. Even those unfamiliar with fish farms are aware that fish farming affords an extremely efficient manner of converting many low order food materials (even those totally unusable directly as food by human beings) into high quality protein. Efficiencies greatly surpassing those obtained in raising poultry, pigs, cattle, etc., are realizable. The conversion of foodstuffs is not only efficient, but surface area utilization is highly efficient.

Surface area utilization efficiency is enhanced when means is provided for oxygenating the water to provide the oxygen necessary to fish life.

The marriage effected by the instant invention of energy storage and recovery with fish farming affords substantial advantages by way of conserving rapidly dwindling fuels (fossil and nuclear), easing the strain on our ecology by pollution, the efficient production of food for human beings in a world growing progressively more hungry and presently being ravished by famine, and making dual use of the water of fish farms.

Numerous other ways in which the windmill driven nutating wheel can drive transducers to store energy will be readily apparent to those of modest skill in the art, it being noted, for example, that the nutating wheel can drive in cyclic and phased sequence a plurality of reciprocating air pumps for compressing air in which event the wheel is coupled to the piston rods of such air compressors rather than the sucker rods of the well pumps. The compressed air can be delivered to an air pressure storage vessel, not shown, as an energy storage means. On the need therefor, such compressed air can be coupled to the turbines of electrical generators, etc., to recover the stored energy.

Attention is now directed to the appended claims.

I claim:

1. Apparatus for converting wind motion to mechanical motion comprising an endless track means defining an endless path, carriage means on said track means, said carriage means including a traction wheel in operative engagement with the track means whereby the carriage means can be propelled about the endless path, omnidirectional windmill means carried by the carriage means, means drivingly connecting the windmill means to the traction wheel, and an energy transducer driven by movement of the carriage means about its endless path.

2. The combination of claim 1, wherein said track means is circular about a central axis normal to the plane of the circular track means, an axle coaxial with said axis, and a radius arm having its opposite ends connected to the axle and to the carriage for angular movement about the axis.

3. The combination of claim 2, including means mounting the axle for nutation movement about a vertical axis, and means mounting the track means on the axle for maintaining the axle and track means mutually perpendicular while also preventing rotation of the track means about the vertical axis, the arrangement of the recited means and the distribution of the masses of the movable parts thereof being such that the axle tends gravitationally to be inclined toward the position of the carriage means.

4. The combination of claim 3, including a fixed and horizontal circular support base disposed below and engaged by the track means for supporting the track means and for limiting the inclination of the axle to the vertical.

5. The combination of claim 4, wherein said transducer means is disposed at a position about the circular extent of the track means, and wherein said transducer means is responsive to vertical motion of such position of the track means.

6. The combination of claim 1, including potential energy storage means, and said transducer means being operatively coupled to the storage means whereby the energy input to the transducer means effected by movement of the carriage means about track means is transferred to and stored by the storage means.

7. The combination of claim 6, wherein said transducer means comprises a water pump, and wherein said storage means comprises upper and lower water reservoirs with said water pump being operatively interposed between said reservoirs.

8. The combination of claim 7, wherein the upper water reservoir is adapted to be stocked with fish to constitute a fish farm.

9. The combination of claim 8, wherein means response to operation of the pump is provided for aerating the water of the upper water reservoir whereby oxygen is introduced for enhancement of aquadic life in the upper reservoir.

10. The combination of claim 7, including means for conducting water from the upper to the lower reservoir, a second energy transducer driven by potential energy released on water being conducted from the upper to the lower reservoir, each of said reservoirs being adapted to constitute a fish farm, means operative on operation of the water pump to aerate the water of the upper reservoir, and means operative on water being conducted to the lower reservoir, to aerate water in the lower reservoir, the arrangement being such that the waters of the reservoir have oxygen introduced thereinto to enhance aquadic life therein.

11. The combination of claim 10, wherein said second transducer has an electrical energy output.

12. The combination of claim 4, wherein said transducer means comprises a plurality of individual transducers circumferentially spaced about the track means, with each of said transducers being responsive to derive their energy input from its vertical motion that accompanies nutation of the axle.

13. The combination of claim 12, wherein each of said transducers is a water pump that includes a vertically reciprocable pump rod.

14. The combination of claim 13, including upper and lower water reservoirs with all the water pumps arranged to pump water from the lower to the upper water reservoir, the arrangement being such that the operation of the water pumps are phased in time with respect to each other with each pump effecting a discharge on each cycle of nutation movement of the axle.

* * * * *